United States Patent [19]

Barchus

[11] Patent Number: 5,102,081

[45] Date of Patent: Apr. 7, 1992

[54] TELESCOPABLE PIVOTAL MOUNTING ASSEMBLY

[76] Inventor: David D. Barchus, 3673 Taft Ct., Wheat Ridge, Colo. 80033

[21] Appl. No.: 670,346

[22] Filed: Mar. 15, 1991

[51] Int. Cl.⁵ .......................................... F16M 11/14
[52] U.S. Cl. .................................. 248/181; 248/283; 248/371; 248/499
[58] Field of Search ............... 248/179, 176, 177, 178, 248/181, 183, 278, 288.3, 288.5, 371, 919, 920, 921, 922, 923, 924, 349, 499

[56] References Cited

U.S. PATENT DOCUMENTS

| | | |
|---|---|---|
| 1,751,895 | 3/1930 | Stewart . |
| 1,910,864 | 5/1933 | Szyminski . |
| 2,698,152 | 12/1954 | Kaye ............................ 248/924 X |
| 4,159,092 | 6/1979 | DeLano ............................ 248/276 |
| 4,365,779 | 12/1982 | Bates et al. ..................... 248/179 X |
| 4,483,503 | 11/1984 | Gahan ............................ 248/181 X |
| 4,533,105 | 8/1985 | Cornwell, Jr. et al. ............ 248/371 |
| 4,562,988 | 1/1986 | Bumgardner ..................... 248/183 X |
| 4,564,166 | 1/1986 | Craft et al. ..................... 248/288.5 X |
| 4,566,663 | 1/1986 | Barchus ............................ 248/324 |
| 4,570,892 | 2/1986 | Czech et al. ..................... 248/183 X |
| 4,645,153 | 2/1987 | Granzow et al. ................. 248/181 X |
| 4,659,053 | 4/1987 | Holley et al. ..................... 248/181 X |
| 4,696,449 | 9/1987 | Woo et al. ....................... 248/499 X |

*Primary Examiner*—Ramon O. Ramirez
*Attorney, Agent, or Firm*—John R. Flanagan

[57] ABSTRACT

A telescopable pivotal mounting assembly includes a base bracket attachable to a support structure, a support bracket fitted with the base bracket for pivotal movement relative thereto, a releasable holding mechanism, extension brackets and a strapping and tightening mechanism. The releasable holding mechanism connects the support bracket with the base bracket and is capable of adjustment between loosened and tightened conditions for respectively permitting disposing and securing the support bracket at a selected one of different angular positions relative to the base bracket. The extension brackets are adjustably mounted to the support bracket so as to permit telescoping movement of the extension brackets toward and away from one another along a common plane defined by the support bracket to correspondingly shortened and lengthen the distance between opposite outer edges of the extension brackets to thereby match such distance with the width of an appliance to be supported on the extension brackets. The strapping and tightening mechanism is used to partially encircle the appliance when seated against the extension brackets and is operable for releasably securing the appliance against the extension brackets so as to respectively mount, support, or suspend the appliance upon, adjacent to, or from below the extension brackets.

16 Claims, 4 Drawing Sheets

TELESCOPABLE PIVOTAL MOUNTING ASSEMBLY

BACKGROUND OF THE INVENTION

1. Field of the Invention

The present invention generally relates to mounting assemblies for appliances and the like and, more particularly, is concerned with a telescopable pivotal mounting assembly.

2. Description of the Prior Art

In movable vehicles, such as mobile homes, vans, campers, boats, etc., as well as in homes, offices, hospitals, and industrial facilities, it is often desirable to mount appliances, such as televisions, clocks, speakers, security monitors, or the like. It is necessary to firmly secure the appliance to prevent damage to it. Also, in places where space is limited, it is often desirable that the appliance be mounted to a ceiling or wall and in such a fashion that the appliance can be adjustably oriented for best use.

Thus, one performance requirement of a satisfactory mounting assembly for an appliance is that the mounting assembly be easily adjustable in order to be able to properly orient the appliance. Further, another performance requirement is that the mounting assembly firmly secure the supported appliance in the desired orientation. The pivotal mounting assembly illustrated and described in U.S. Pat. No. 4,566,663 to David D. Barchus, the inventor herein, satisfied these performance requirements and represented a significant advance in the art. The Barchus appliance mounting assembly is readily adjustable and capable of locking the supported article firmly in place.

However, one drawback of the Barchus mounting assembly relates to the arrangement employed to firmly secure the appliance to the mounting assembly. The securing arrangement contemplates the use of fasteners, such as lag screws or bolts, to directly attach the appliance upon a swivel bracket or a base bracket of the assembly. This securing arrangement requires that permanent holes be available or be drilled in the appliance to receive the fasteners. This may not be desirable from the standpoint of appliance owner. Also, this securing arrangement requires that the weight of appliance in being transferred to the mounting assembly will be concentrated at the sites on the appliance where connections are provided by the fasteners with the appliance. This concentration of the weight of the appliance at the sites of the holes receiving the fasteners might eventually result in propagation of cracks in the housing or case of the appliance.

Consequently, there is a need for improvement of the design of the Barchus appliance mounting assembly to eliminate its drawback without sacrificing the significant advance it brought to the art.

SUMMARY OF THE INVENTION

The present invention provides a telescopable pivotal mounting assembly designed to satisfy the aforementioned need. The mounting assembly of the present invention is designed to be mounted on the top, bottom or side of an appliance, such as a television or the like. The mounting assembly can be adjusted to accommodate appliances having different widths. Instead of requiring connections with holes in the appliance, the mounting assembly of the present invention also incorporates a pair of flexible straps and ratcheting hold-down devices for tightening the straps around the appliance to secure the appliance against the telescopable extension brackets. Releasable hook and pile attachment patches are applied to the contact surfaces between the appliance, straps and extension brackets to prevent slippage between them.

Accordingly, the present invention is directed to a telescopable pivotal mounting assembly which comprises: (a) a base bracket capable of stationary attachment to a support structure; (b) a support bracket disposed in a fitted relationship with the base bracket and capable of pivotal movement relative to the base bracket; (c) a releasable holding mechanism connecting the support bracket with the base bracket and being capable of adjustment between loosened and tightened conditions for respectively permitting disposing and securing of the support bracket at a selected one of different angular positions relative to the base bracket; (d) a pair of extension brackets adjustably mounted to the support bracket so as to permit telescoping movement of the extension brackets relative to the support bracket and toward and away from one another along a common plane defined by the support bracket to shortened and lengthen the distance between opposite outer edges of the extension brackets to thereby match such distance with the width of an appliance to be supported on the extension brackets; and (e) means for partially encircling the appliance when seated against the extension brackets and being operable for releasably securing the appliance against the extension brackets so as to respectively mount, support, or suspend the appliance upon, adjacent to, or from below the extension brackets.

The encircling and securing means includes a strapping and tightening mechanism mounted to one of the outer edges of the extension brackets and attachable to the other of the outer edges thereof. The strapping and tightening mechanism includes a pair of flexible straps attached at one end to the other of the outer edges of the extension brackets and a pair of ratcheting hold-down devices mounted to the one of the outer edges and being operable for tightening the straps partially around the appliance to hold and secure the appliance against the extension brackets. Also, releasable hook and pile attachment patches can be applied to the straps, the appliance, and the extension brackets to prevent slippage between them.

Additionally, the assembly includes means for adjustably mounting the extension brackets to the opposite end portions of the support bracket so as to permit the telescoping movement of the extension brackets toward and away from one another along a common plane. The mounting means includes a pair of laterally spaced rails formed on each of the opposite end portions of the support bracket for slidably receiving and guiding the extension brackets therebetween as the extension brackets undergo telescoping movement relative to one another and to the support bracket.

The mounting means further includes a plurality of holes laterally spaced from one another and defined in each of the opposite end portions of the support bracket between the pair of rails thereon, a plurality of elongated parallel slots defined in each of the extension brackets which extend in alignment with the plurality of holes in the corresponding opposite end portions of the support bracket as the extension brackets undergo the telescoping movement relative to one another and to the support bracket, and a plurality of fasteners installed through the holes of the support bracket opposite end portions and the slots of the respective extension brackets and being adjustable for releasably securing the extension brackets to the opposite end portions of the support bracket.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 1:
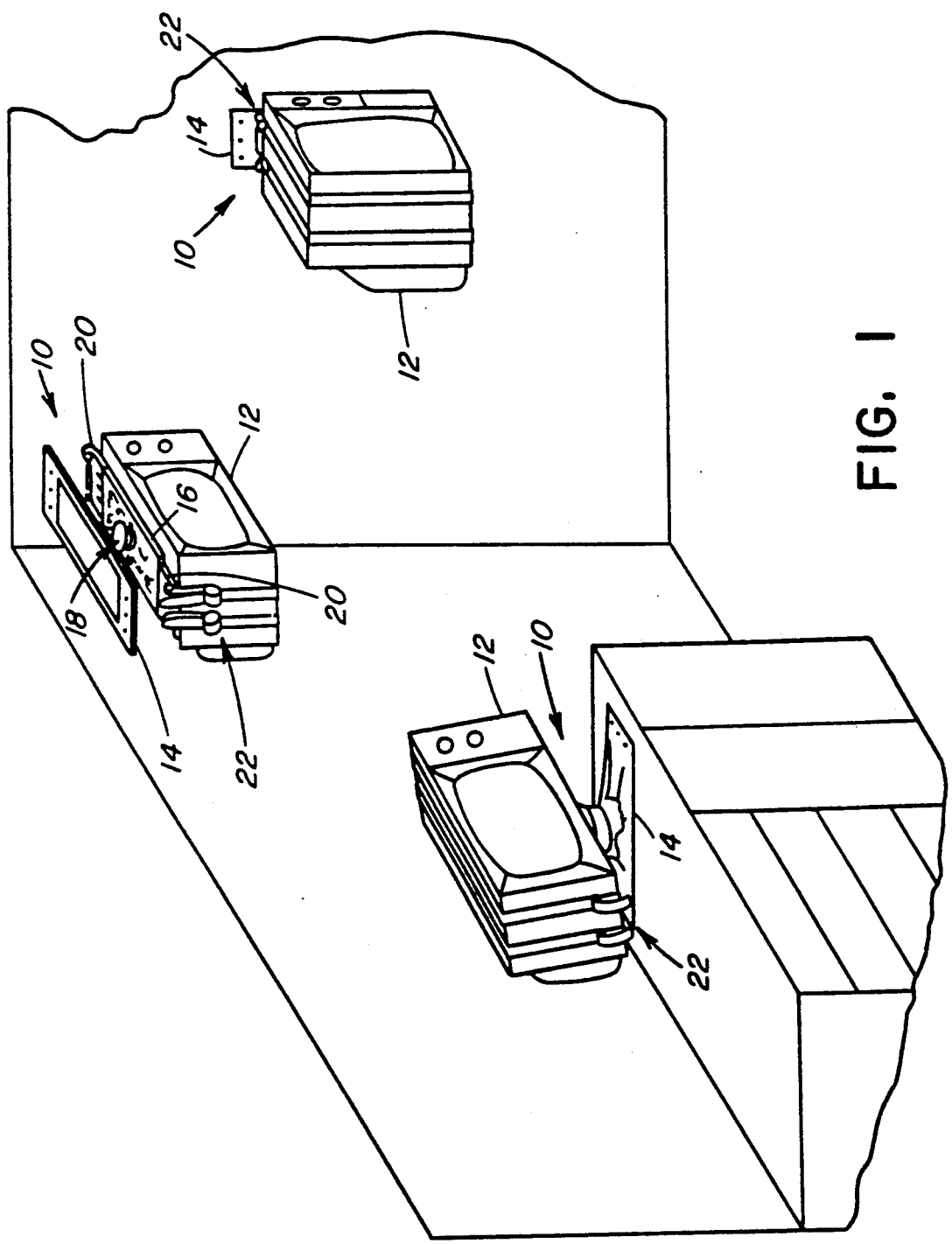
FIG. 1 is a perspective view of a conventional television upon a desk, supported on a wall, and suspended from a ceiling by a telescopable pivotal mounting assembly of the present invention.
Figure 2:
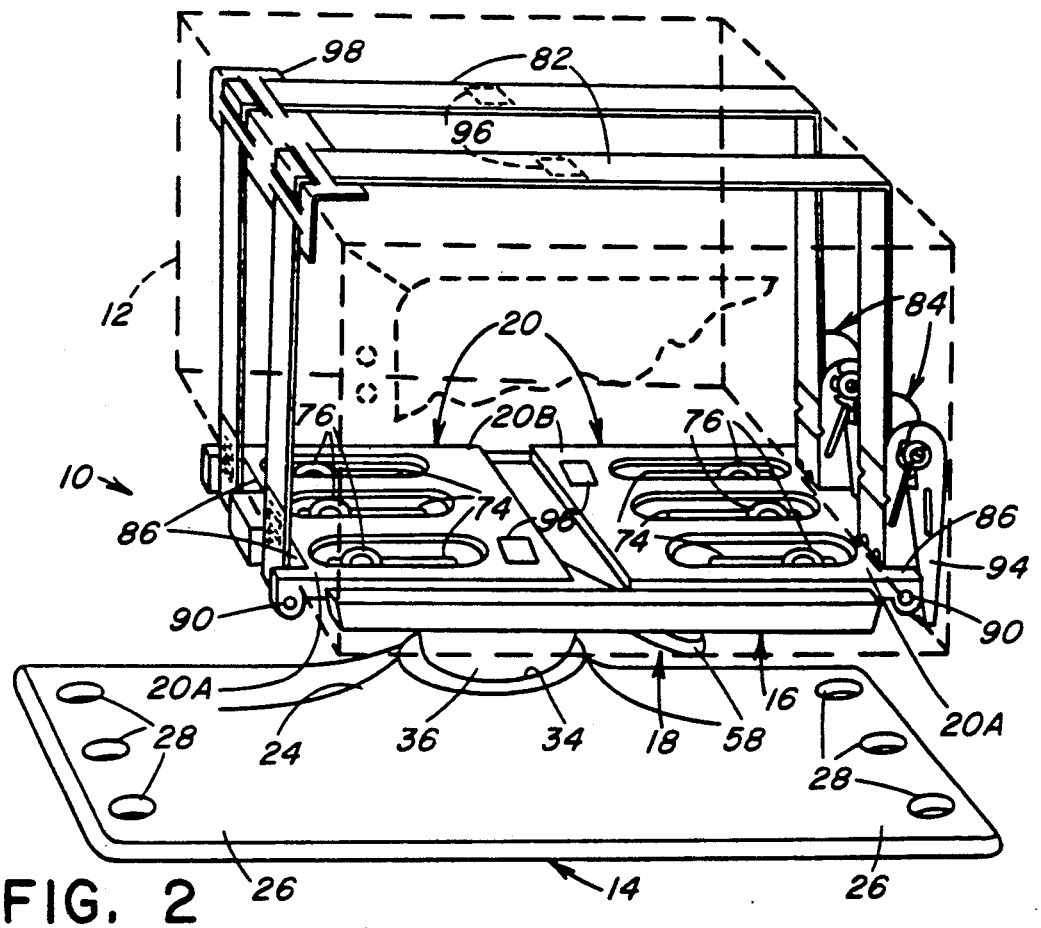
FIG. 2 is a perspective view of the telescopable pivotal mounting assembly of the present invention shown supporting a television with the television illustrated in phantom outline form.
Figure 3:
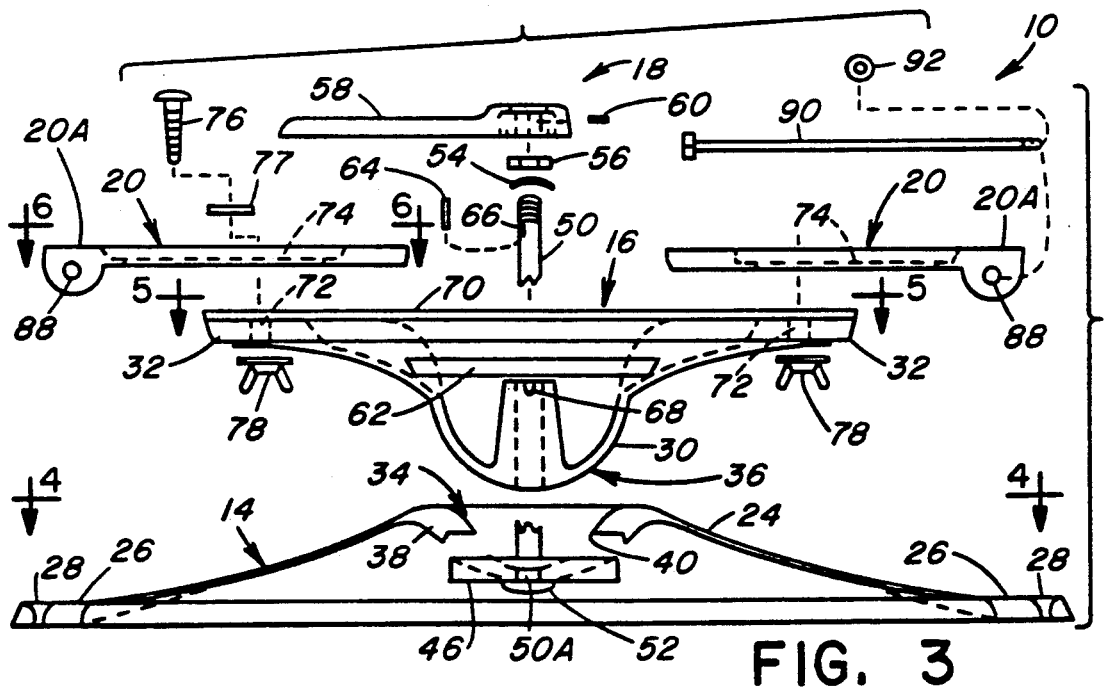
FIG. 3 is an exploded elevational view, with parts sectioned, of the telescopable pivotal mounting assembly.
Figure 4:
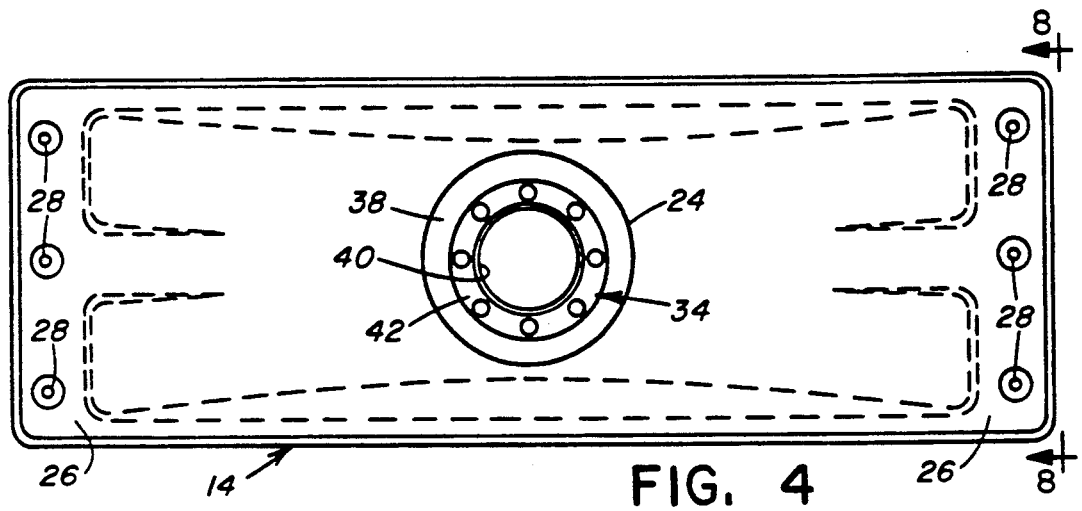
FIG. 4 is a top plan view of a base bracket of the mounting assembly as seen along line 4—4 of FIG. 3.
Figure 5:
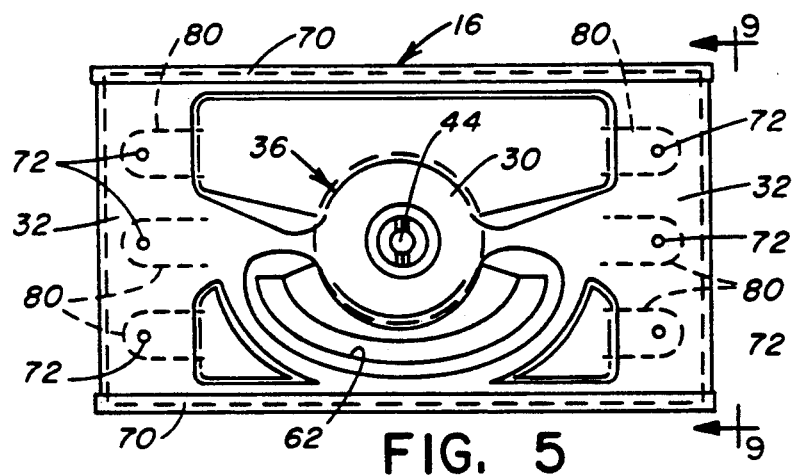
FIG. 5 is a top plan view of a support bracket of the mounting assembly as seen along line 5—5 of FIG. 3.

Referring to the drawings, and particularly to FIG. 1, there is illustrated several of the different places and orientations in which the telescopable pivotal mounting assembly 10 of the present invention can be employed to mount upon a desk, support on a wall, or suspend from a ceiling, a conventional appliance, such as a television 12. Referring also to FIGS. 2 and 3, the mounting assembly 10 basically includes a base bracket 14, a support bracket 16, a releasable holding mechanism 18, a pair of extension brackets 20, and a strapping and tightening mechanism 22.

The base bracket 14 is capable of attachment to a support structure, such as the desk, ceiling or wall, as depicted in FIG. 1. The support bracket 16 is fitted to the base bracket 14 for pivotal movement relative thereto. The releasable holding mechanism 18 connects the support bracket 16 with the base bracket 14 and is capable of adjustment between loosened and tightened conditions for permitting the support bracket 16 to be pivotally moved, or swiveled, and then secured at a selected one of different angular positions relative to the base bracket 14. The extension brackets 20 are adjustably mounted to the support bracket 16 so as to permit the extension brackets 20 to undergo telescoping movement toward or away from one another along a common plane defined by the support bracket 16. Such telescoping movement of the extension brackets 20 relative to one another correspondingly shortens or lengthens the distance between their opposite outer edges 20A to match such distance with the width of the particular appliance, such as the television 12, to be supported on the extension brackets 20. The strapping and tightening mechanism 22 is used to partially encircle the appliance when seated against the extension brackets 20 and is operable for releasably securing the appliance against the extension brackets 20 so as to permit the appliance 12 to be mounted, supported, or suspended respectively upon, adjacent to, or from below the extension brackets 20.

Referring to FIGS. 2–4, 7 and 8, the base bracket 14 of the mounting assembly 10 preferably has a rectangular configuration with an center portion 24 and a pair of opposite end portions 26. The opposite end portions 26 extend in opposite directions from the center portion 24 and lie in a common plane. The center portion 26 projects outwardly from the plane of the opposite end portions 26. The co-planar opposite end portions 26 are thus adapted for placement against the support structure to which the mounting assembly 10 is to be attached. Preferably, the opposite end portions 26 each includes a plurality of openings 28 for facilitating attachment of the base bracket 14 to the support structure, such as by receiving screws (not shown) which are then threaded into the support structure. Preferably, the openings 28 in one end portion 26 are displaced sixteen inches from the openings 26 in the other end portion 26 to facilitate attachment of the base bracket 14 to standard wall and ceiling studs.

Referring to FIGS. 2, 3, 5, 7 and 9, the support bracket 16 of the mounting assembly 10 also preferably has a rectangular configuration with a center portion 30 and a pair of opposite end portions 32. The opposite end portions 32 extend in opposite directions from the center portion 30 and lie in a common plane. Preferably, the center portion 24 of the base bracket 14 forms a socket 34, whereas the center portion 30 of the support bracket 16 forms a ball 36, although the arrangement could be reversed. The ball 36 mates with the socket 34 so as to permit pivotal movement of the ball 36 relative to the socket 34 and thereby pivotal, swiveling-type movement of the support bracket 16 relative to the base bracket 14. The socket 34 has a countersunk portion 38 defining an opening 40 at a central, lowermost region therein. A bushing 42 is provided about the socket opening 40. An elongated bore 44 extends generally axially through the ball 36.

Figure 7:
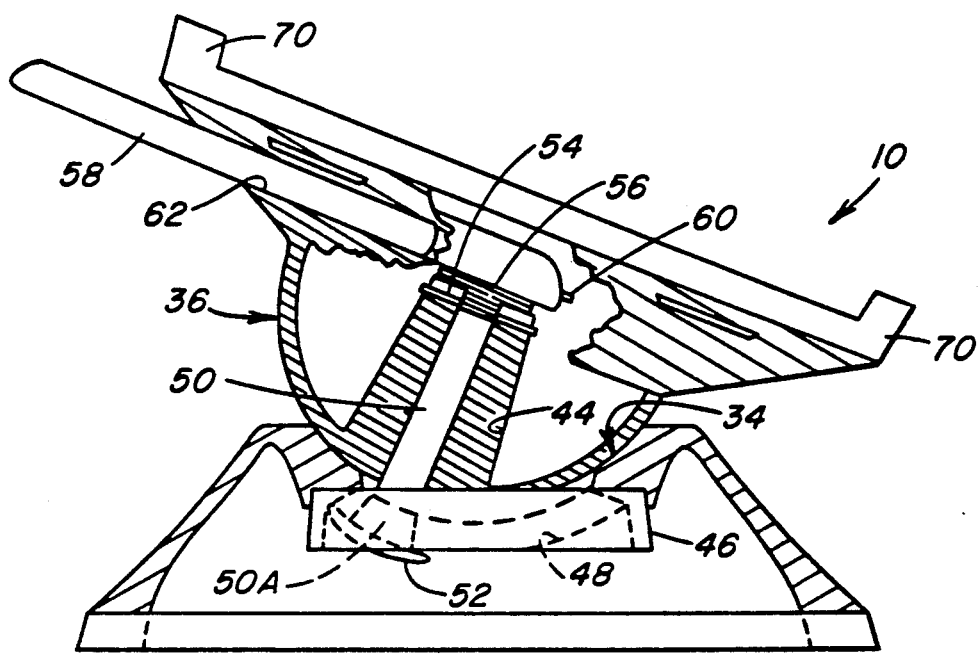
FIG. 7 is an enlarged cross-sectional view of the assembly of FIG. 3 without the telescopable extension brackets.
Figure 9:
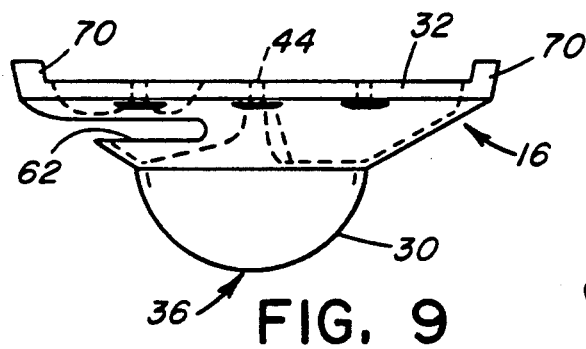
FIG. 9 is an enlarged end elevational view of the support bracket as seen along line 9—9 of FIG. 5.
Figure 10:
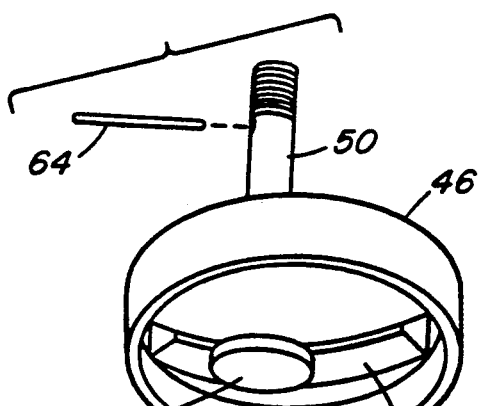
FIG. 10 is an enlarged perspective view of some components of a releasable holding mechanism of the mounting assembly of FIG. 3.
Figure 8:
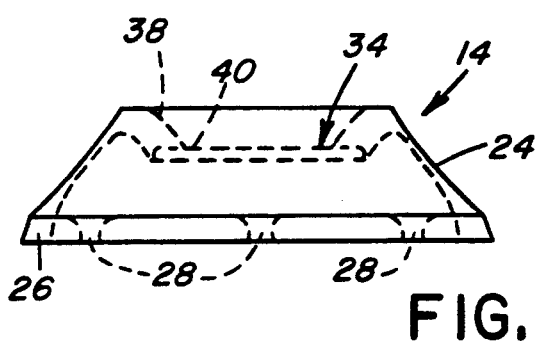
FIG. 8 is an enlarged end elevational view of the base bracket as seen along line 8—8 of FIG. 4.

Referring to FIGS. 3, 7 and 10, the releasable holding mechanism 18 of the mounting assembly 10 connects the ball 36 of the support bracket 16 with the socket 34 of the base bracket 14. The holding mechanism 18 includes a concavo-convex disc 46 fitted in the countersunk portion 38 around the opening 40 of the socket 34 of the base bracket 14 and rotatable relative thereto. Further, the disc 46 has an elongated slot 48 extending diametrically across it which has a generally rectangular configuration.

The holding mechanism 18 also includes an elongated bolt 50 extending through the bore 44 of the ball 36. One end of the bolt 50 extends through the slot 48 of the disc 46 and terminates in an enlarged head 52. Preferably, a portion 50A of the bolt 50 adjacent to the head 52 is square in cross-section such that the bolt 50 cannot rotate relative to the slot 48 in the disc 46. The other end of the bolt 50 is threaded and receives thereon a spring washer 54 and a nut 56.

The holding mechanism 18 further includes a handle 58 having a socket defined at one end which permits the handle to be placed over the nut 56 and anchored thereto by a set screw 60. The handle 58 extends radially outwardly from the bolt 50 through a channel 62 defined at the base of the ball 36 to where its outer end can be grasped by a user. A spring pin 64 is installed in a hole 66 in the bolt 50 to prevent the bolt 50 from rotating relative to the ball 36. A slot 68 is provided in the ball 36 for receiving the protruding end of the spring pin 64 permitting it to ride freely in the axial direction of the bolt 50 as the handle 58 is turned to loosen the nut 56 upon the end of the bolt 50.

When the nut 56 is loosened by turning the handle 58 in one direction, the holding mechanism 18 and the swivel joint provided by the ball 36 and socket 34 are placed in loosened conditions such that the user can then tilt and rotate, or swivel, the support bracket 16 to a selected angular position relative to the base bracket 14. Then, when the nut 56 is re-tightened by turning the handle 58 in an opposite direction, the holding mechanism 18 and the swivel joint provided by the ball 36 and socket 34 are placed in tightened conditions such that the support bracket 16 is retained in the selected position relative to the base bracket 14. The spring washer 54 stabilizes the swivel joint provided by the ball 36 and socket 34 while in the loosened condition.

Referring now to FIGS. 2, 3 and 5-7, the pair of extension brackets 20 of the mounting assembly 10 are in the form of generally flat plates having respective opposite outer and inner edges 20A, 20B. The mounting assembly 10 also includes means for adjustably mounting the extension brackets 20 to the opposite end portions 32 of the support bracket 16. The mounting relationship of the extension brackets 20 to the support bracket 16 permits telescoping movement of the extension brackets 20 toward or away from one another along the common plane defined by the opposite end portions 32 of the support bracket 16. Such telescoping movement of the extension brackets 20 correspondingly shortened or lengthen the distance between their opposite outer edges 20A to thereby match such distance with the width of the appliance 12 to be supported on the extension brackets 20, such as the television shown in phantom outline in FIG. 2.

These mounting means of the mounting assembly 10 include a pair of laterally spaced side rails 70 integrally formed on the support bracket 16 so as to extend along opposite sides of the opposite end portions 32 and between opposite ends of the support bracket 16. As seen in FIG. 2, the extension brackets 20 are slidably received between the side rails 70. Also, a plurality of holes 72 are defined through each of the opposite end portions 32 of the support bracket 16 between the side rails 70. The holes 72 in each opposite end portion 32 are laterally spaced from one another and aligned in a transversely-extending row relative to the side rails 70. Further, a plurality of elongated parallel slots 74 are defined in each of the extension brackets 20. These slots 74 extend in alignment with holes 72 in the support bracket end portions 32 as the extension brackets 20 are slidably moved in telescoping fashion relative to the respective opposite end portions 32 of the support bracket 16. A plurality of fasteners in the form of screws 76, with spring washers 77 and wing nuts 78, are installed through the holes 72 of the support bracket opposite end portions 32 and through the aligned slots 74 of the respective extension brackets 20. The wing nuts 78 of the fasteners are adjustable for releasably securing the extension brackets 20 at desired positions to the opposite end portions 32 of the support bracket 16. Flat lands 80 on the support bracket 16 surround the holes 72 for leveling the spring washers 77 and wing nuts 78 as they are tightened.

Referring to FIG. 2, the strapping and tightening mechanism 22 of the mounting assembly 10 is mounted to the outer edge 20A of the right extension bracket 20, attached to the outer edge 20A of the left extension bracket 20, and is capable of partially encircling the appliance 12 being seated against the extension brackets 20. Also, the strapping and tightening mechanism 22 is operable for releasably securing the partially encircled appliance 12 against the extension brackets 20. As seen in FIG. 2, the strapping and tightening mechanism 22 includes a pair of flexible straps 82 and a pair of ratcheting hold-down devices 84. The straps 82 can be composed of any suitable material having sufficient strength, for example nylon. The devices 84 are conventional off-the-shelf components, being commercially available from Caldwell Co. Inc. of Rockford, Ill., and designated by the model number 43320.

Further as seen in FIG. 2, the outer edges 20A of the extension brackets 20 have cutouts 86 and aligned transversely-extending openings 88. A bolt 90 with a nut 92 on its threaded en extends through the aligned openings 88 at the outer edge 20A of each extension bracket 20. The ratcheting hold-down devices 84 are pivotally mounted within the cutouts 86 to the one bolt 90 mounted to the outer edge 20A of the right extension bracket 20. The ends of the straps 82 are attached in the cutouts 86 to the other bolt 90 mounted to the outer edge 20A of the left extension bracket 20. The straps 82 then extend over the appliance to the opposite ends which are wound on the ratcheting hold-down devices 84. The devices 84 which operate in a conventionally known manner have pivotal levers 94 and catches (not shown) which are manipulated to either cause winding or unwinding of the straps 82 onto or from the devices 94 to correspondingly shorten or lengthen and thereby tighten or loosen the straps 82 relative to the appliance 12. In such manner, the devices 84 are operable for releasably fitting and tightening the straps 82 partially around the appliance 12 by varying or adjusting the effective lengths of the straps 82 to match the distance around the appliance 12 encircled by the straps 82 and thereby hold and secure the appliance 12 against the extension brackets 20.

Figure 6:
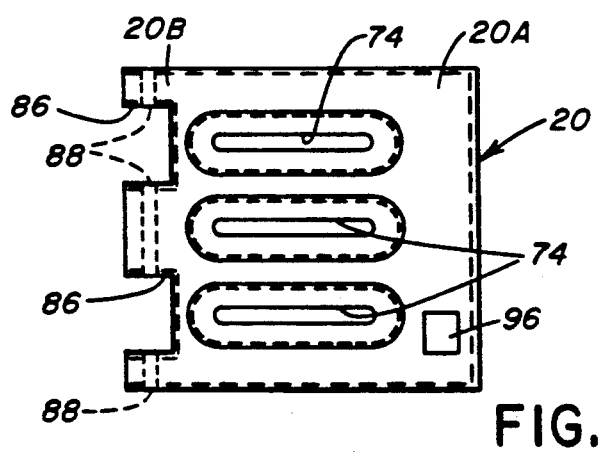
FIG. 6 is a top plan view of one of a pair of telescopable extension brackets of the mounting assembly as seen along 6—6 of FIG. 3.

Referring to FIGS. 2 and 6, the mounting assembly 10 also preferably can include a plurality of pairs of releasable hook and pile attachment patches 96. The complementary attachment patches 96 are applied to the appliance 12 and to the extension brackets 20 and straps 82 to prevent slippage between the appliance 12 and the extension brackets 20 and straps 82. Also, cushion members 98 (only one being shown) can be interweaved with the straps 82 for fitting over corners of the appliance so as to reduce wear on the straps 82.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

Having thus described the invention, what is claimed is:

1. A telescopable pivotal mounting assembly, comprising:
    (a) a base bracket capable of stationary attachment to a support structure;
    (b) a support bracket disposed in a fitted relationship with said base bracket and capable of pivotal movement relative to said base bracket;
    (c) a releasable holding mechanism connecting said support bracket with said base bracket and being capable of adjustment between loosened and tightened conditions for respectively permitting pivotally moving and securing of said support bracket at a selected one of different angular positions relative to said base bracket;
    (d) a pair of extension brackets adjustably mounted to said support bracket so as to permit telescoping movement of said extension brackets relative to said support bracket and toward or away from one another along a common plane defined by said support bracket to correspondingly shortened or lengthen the distance between opposite outer edges of said extension brackets to thereby match such distance with the width of an appliance to be supported on said extension brackets; and
    (e) means for partially encircling the appliance when seated against the extension brackets and being operable for releasably securing the appliance against the extension brackets so as to respectively mount, support, or suspend the appliance upon, adjacent to, or from below said extension brackets, said encircling and securing means including a strapping and tightening mechanism mounted to one of said outer edges of said extension brackets, attached to the other of said outer edges thereof, and capable of partially encircling the appliance when seated against said expansion brackets, said strapping and tightening mechanism being operable for releasably securing the partially encircled appliance against said expansion brackets, said strapping and tightening mechanism including
        (i) a pair of flexible straps each attached at one end to said other outer edge of said extension brackets, and
        (ii) a pair of hold-down devices mounted to said one outer edges of said extension brackets, each of said hold-down devices being connected to an opposite end of one of said flexible straps, said hold-down devices being operable to cause unwinding and winding of said flexible straps onto and from said hold-down devices to correspondingly lengthen and shorten, and thereby loosen and tighten, said flexible straps relative to the appliance for releasably fitting and tightening said straps partially around the appliance, by adjusting the effective lengths of said flexible straps to match the distance around the appliance encircled by said flexible straps, and thereby hold and secure the appliance against said extension brackets.

2. The assembly of claim 1 wherein one of said base bracket and said support bracket forms a socket whereas the other of said base bracket and support bracket forms a ball which mates with said socket so as to permit pivotal movement of said ball and socket relative to one another.

3. The assembly of claim 2 wherein said holding mechanism connects said ball and socket of said base bracket and supporting bracket and is adjustable for securing said ball and socket at different positions relative to one another so as to disposed said support bracket at said selected one of different positions relative to said base bracket.

4. The assembly of claim 1 further comprising:
    a plurality of pairs of releasable hook and pile attachment patches for application to the appliance and to said extension brackets to prevent slippage between them.

5. The assembly of claim 1 further comprising:
    means for adjustably mounting said extension brackets to opposite end portions of said support bracket so as to permit telescoping movement of said extension brackets toward and away from one another along said common plane defined by said support bracket.

6. The assembly of claim 5 wherein said mounting means includes a pair of laterally spaced rails formed on said support bracket and extending along opposite sides of said opposite end portions of said support bracket for slidably receiving said extension brackets therebetween.

7. The assembly of claim 6 wherein said mounting means further includes:
    a plurality of holes defined in each of said opposite end portions of said support bracket, said holes being spaced apart and aligned in a row extending between said pair of rails thereon;
    a plurality of elongated parallel slots defined in each of said extension brackets and extending in alignment with said plurality of holes in a corresponding one of said opposite end portions of said support bracket as said extension bracket is slidably moved relative to said respective one of said opposite end portions of said support bracket; and
    a plurality of fasteners installed through said holes of said support bracket opposite end portions and said slots of said respective extension brackets and being adjustable for releasably securing said extension brackets to said opposite end portions of said support bracket.

8. A telescopable pivotal mounting assembly, comprising:
    (a) a base bracket having a center portion and a pair of opposite end portions extending in opposite directions from said center portion for placement against a support structure to which said assembly is to be attached, said opposite end portions including means for facilitating attachment of said base bracket to the structure;
    (b) a support bracket having a center portion, a pair of opposite end portions extending in opposite directions from said center portion and lying in a common plane, and a pair of opposite sides extending along said center portion and opposite end portions, said center portion of one of said base and support brackets forming a socket and said center portion of the other of said base and support brackets forming a ball which mates with said socket so as to permit pivotal movement of said ball and socket relative to one another;
    (c) a releasable holding mechanism interconnecting said ball and socket of said center portions of said base and support brackets and being adjustable for securing said ball and socket at different positions relative to one another so as to disposed said support bracket at a selected one of different positions relative to said base bracket;

(d) a pair of extension brackets having respective opposite inner and outer edges;

(e) means for adjustably mounting said extension brackets to said opposite end portions of said support bracket so as to permit telescoping movement of said expansion brackets toward or away from one another along said common plane defined by said support bracket to correspondingly shortened or lengthen the distance between opposite outer edges of said extension brackets to thereby match such distance with the width of an appliance to be supported on said extension brackets; and (f) means for partially encircling the appliance when seated against said extension brackets and being operable for releasably securing the appliance against said extension brackets so as to respectively mount, support, or suspend the appliance upon, adjacent to, or from below said extension brackets;

(g) said means for adjustably mounting said extension brackets to said opposite end portions of said support brackets including (i) means defining a plurality of holes in each of said opposite end portions of said support bracket, said holes being spaced apart from one another and aligned in a row extending between said opposite sides of said support bracket, (ii) a plurality of elongated parallel slots defined in each of said extension brackets and extending in alignment with said plurality of holes in a corresponding one of said opposite end portions of said support bracket as said extension bracket is slidably moved relative to said respective one of said opposite end portions of said support bracket, and (iii) a plurality of fasteners installed through said holes of said support bracket opposite end portions and said slots of said respective extension brackets and being adjustable for releasably securing said extension brackets to said opposite end portions of said support brackets.

9. The assembly of claim 8 wherein said mounting means includes a pair of laterally spaced rails formed on said support bracket and extending along opposite sides of said opposite end portions of said support bracket for slidably receiving said extension brackets therebetween.

10. The assembly of claim 8 wherein said encircling and securing means includes a strapping and tightening mechanism mounted to one of said outer edges of said extension brackets, attached to the other of said outer edges thereof, and capable of partially encircling the appliance when seated against said expansion brackets, said strapping and tightening mechanism being operable for releasably securing the partially encircled appliance against said expansion brackets.

11. The assembly of claim 10 wherein said strapping and tightening mechanism includes:

a pair of flexible straps attached at one end to said other outer edges of said extension brackets; and a pair of hold-down devices mounted to said one outer edges of said extension brackets and being operable for releasably tightening said straps partially around the appliance to secure the appliance against said extension brackets.

12. The assembly as recited in claim 11 further comprising:

a cushion member interweaved with said straps for fitting over corners of the appliance so as to reduce wear on said straps.

13. The assembly of claim 8 further comprising:

a plurality of pairs of releasable hook and pile attachment patches for application to the appliance and to said extension brackets to prevent slippage between them.

14. A telescopable pivotal mounting assembly, comprising:

(a) a support bracket capable of stationary attachment to a support structure;

(b) a support bracket disposed in a fitted relationship with said base bracket and capable of pivotal movement relative to said base bracket;

(c) a releasable holding mechanism connecting said support bracket with said base bracket and being capable of adjustment between loosened and tightened conditions for respectively permitting disposing and securing of said support bracket at a selected one of different angular positions relative to said base bracket;

(d) a pair of extension brackets having respective opposite inner and outer edges;

(e) means for adjustably mounting said extension brackets to said support brackets so as to permit telescoping movement of said expansion brackets toward and away from one another along said common plane defined by said support bracket to correspondingly shortened and lengthen the distance between opposite outer edges of said extension brackets to thereby match such distance with the width of an appliance to be supported on said extension bracket; and (f) a strapping and tightening mechanism mounted to one of said outer edges of said extension brackets, attached to the other of said outer edges thereof, and capable of partially encircling the appliance when seated against said expansion brackets, said strapping and tightening mechanism being operable for releasably securing the partially encircled appliance against said expansion brackets so as to respectively mount, support, or suspend the appliance upon, adjacent to, or from below said extension brackets, said strapping and tightening mechanism including (i) a pair of flexible straps each attached at one end to said other outer edge of said extension brackets, and (ii) a pair of hold-down devices mounted to said one outer edges of said extension brackets, each of said hold-down devices being connected to an opposite end of one of said flexible straps, said hold-down devices being operable to cause unwinding and winding of said flexible straps onto and from said hold-down devices to correspondingly lengthen and shorten, and thereby loosen and tighten, said flexible straps relative to the appliance for releasably fitting and tightening said straps partially around the appliance, by adjusting the effective lengths of said flexible straps to match the distance around the appliance encircled by said flexible straps, and thereby hold and secure the appliance against said extension brackets.

15. The assembly as recited in claim 14 further comprising:
a cushion member interweaved with said straps for fitting over corners of the appliance so as to reduce wear on said straps.

16. The assembly of claim 14 further comprising:
a plurality of pairs of releasable hook and pile attachment patches for application to the appliance and to said extension brackets to prevent slippage between them.

* * * * *